United States Patent
Lin

(10) Patent No.: US 9,099,923 B1
(45) Date of Patent: Aug. 4, 2015

(54) HYBRID POWER SUPPLY ARCHITECTURE

(71) Applicant: Celestica Technology Consultancy (Shanghai) Co., Ltd., Shanghai (CN)

(72) Inventor: Cheng-Hung Lin, Shanghai (CN)

(73) Assignee: Celestica Technology Consultancy (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 14/490,719

(22) Filed: Sep. 19, 2014

(30) Foreign Application Priority Data

Jan. 21, 2014 (TW) .............................. 103102177 A

(51) Int. Cl.
  *H02M 3/158* (2006.01)
  *G05F 1/575* (2006.01)
  *H02M 1/00* (2007.01)

(52) U.S. Cl.
  CPC ............. *H02M 3/1584* (2013.01); *G05F 1/575* (2013.01); *H02M 2001/0045* (2013.01)

(58) Field of Classification Search
  CPC ........................................................ G05F 1/575
  USPC .......................................... 323/268, 273–285
  See application file for complete search history.

(56) References Cited

U.S. PATENT DOCUMENTS

| | | | |
|---|---|---|---|
| 7,230,408 B1* | 6/2007 | Vinn et al. | 323/273 |
| 7,535,183 B2* | 5/2009 | Gurr | 315/247 |
| 7,990,119 B2* | 8/2011 | Petty | 323/273 |
| 2006/0125454 A1* | 6/2006 | Chen et al. | 323/282 |
| 2007/0290657 A1* | 12/2007 | Cretella et al. | 323/222 |

\* cited by examiner

*Primary Examiner* — Jessica Han
(74) *Attorney, Agent, or Firm* — Novak Druce Connolly Bove + Quigg LLP

(57) ABSTRACT

A hybrid power supply architecture including a microcontroller, a linear regulator, a first current sensing unit, a second current sensing unit, a switching regulator, a PWM controller and a hybrid output stage is disclosed. The linear and switching regulators respectively perform linear and switching regulation according to a first enable signal and a second enable signal generated by the microcontroller to generate a linear output power and a switching output power. The first and second current sensing units respectively generate a first current sensing signal and a second current sensing signal by sensing the linear and switching output powers. The microcontroller receives the first and second current sensing signals to determine a loading state. The switching regulator is enabled to actuate in case of heavy loading, and particularly the linear regulator is shut off only when the switching output power is stable, thereby implementing the best conversion efficiency.

7 Claims, 4 Drawing Sheets

HYBRID POWER SUPPLY ARCHITECTURE

CROSS-REFERENCE TO RELATED APPLICATION

This application claims the priority of Taiwanese patent application No. 103102177, filed on Jan. 21, 2014, which is incorporated herewith by reference.

BACKGROUND OF THE INVENTION

1. Field of the Invention

The present invention generally relates to a hybrid power supply architecture, and more specifically to a hybrid power supply architecture actuating a linear regulator and/or a switching regulator based on a loading state so as to achieve optimal electrical efficiency of seamless switching for supplying hybrid power.

2. The Prior Arts

For electronic devices with different electrical properties, it is generally needed to provide various power sources having appropriate voltage, current or electric power. For instance, electric motors are actuated by 12 DCV, analog chips are fed with 3.3V, and digital chips operate at 1.8V. Therefore, power management manufacturers have developed kinds of power regulation device to meet the requirement of the market. Additionally, some voltage regulators with the function of stabilizing the output voltage are needed when the original input power is possibly unstable, like the city power resulting in instant fluctuation of the output voltage due to imbalance of loading. Alternatively, when the output voltage or the output current becomes unstable because the ability of the power supply is limited and fierce variation of the loading is not overcome, the voltage regulator is also necessary.

Two typical schemes including linear regulation and switching regulation have been widely used in the common application field of electronic devices. Linear regulation generally employs linear electronic components such as operational amplifier to co-operate with some voltage or current sensing circuit so as to control the output unit such as power transistor, thereby generating a stable output power by dynamical regulation according to the loading. For switching regulation, the PWM signal with high frequency component is used to control and turn on/off the specific transistor such that the original input power is converted into the output power with specific voltage, current or electric power. At the same time, noise components in the input power are screened out, achieving the object of power regulation and/or power conversion.

Practically, both linear regulation and switching regulation consume part of electric power supplied by the input power, leading to inevitable operation loss which changes with the loading. For example, linear regulation has lower operation loss at light loading, and switching regulation has lower operation loss at heavy loading. In other words, linear regulation is suitable for the application of light loading, and switching regulation is preferred for heavy loading. As a result, it is impossible to use only one of linear regulation and switching regulation to substantially reduce the overall operation loss when the variation range of loading is large, further causing low electrical efficiency.

Therefore, it greatly needs a new hybrid power supply architecture to dynamically switch the linear regulation and the switching regulation based on the actual electrical loading. In particular, the purpose of power supply with seamless switching is successfully fulfilled, and low power consumption and stable output power are implemented, thereby overcoming the problems in the prior arts.

SUMMARY OF THE INVENTION

The primary object of the present invention is to provide a hybrid power supply architecture for converting an input power into an output power with different voltage and current compared to the input power, and further supplying the output power to an external load. The hybrid power supply architecture comprises a microcontroller, a linear regulator, a first current sensing unit, a switching regulator, a second current sensing unit and a hybrid output stage. The linear regulator and the switching regulator respectively perform linear regulation and switching regulation according to the first and second enable signals generated by the microcontroller so as to generate a linear power and a switching power. The first and second current sensing units respectively sense the linear power and the switching power to generate a first current sensing signal and a second current sensing signal. The microcontroller receives the first and second current sensing signals to determine the loading state is light or heavy. Specifically, the microcontroller turns on the linear regulator and turns off the switching regulator at the beginning of supplying the input power, and then turns on the switching regulator when the loading state becomes heavy.

In particular, the linear regulator is turned off only when the switching output power is steady. Similarly, the microcontroller turns on the linear regulator when the loading state becomes light, and the switching regulator is turned off only when the linear output power becomes steady.

In other words, the present invention may control the linear regulator and the switching regulator based on the loading state such that the linear regulator and/or the switching regulator is turned on/off for light and heavy loading, thereby increasing the efficiency of power conversion. Especially, during the switching period for the light loading or the heavy loading, the linear regulator and the switching regulator are still kept working so as to maintain stability of the output power and achieve seamless switching hybrid power supply, thereby effectively protecting the external load.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
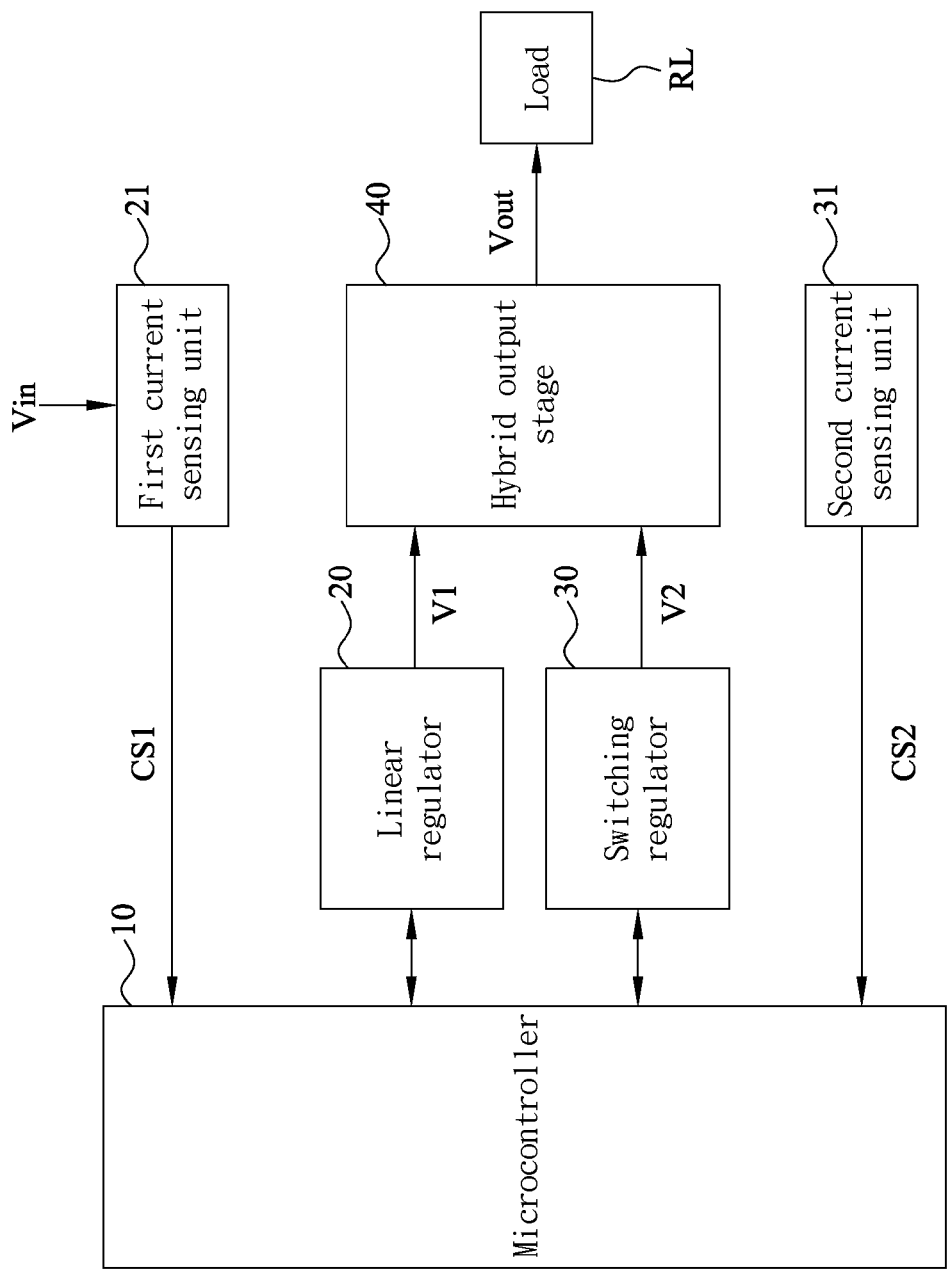
FIG. 1 is a system diagram of the hybrid power supply architecture according to one embodiment of the present invention.

Please refer to FIG. 1 illustrating a system diagram of the hybrid power supply architecture according to one embodiment of the present invention. As shown in FIG. 1, the hybrid power supply architecture of the present invention generally comprises a microcontroller 10, a linear regulator 20, a first current sensing unit 21, a switching regulator 30, a second current sensing unit 31 and a hybrid output stage 40. The microcontroller 10 is configured to perform a preset control operation such that the input power Vin is converted into the output power Vout supplied to the external load RL.

More specifically, the linear regulator 20 provides linear regulation under control of the microcontroller 10, thereby receiving and converting the input power Vin into a linear output power V1. Similarly, the switching regulator 30 performs linear regulation under control of the microcontroller 10 so as to receive and convert the input power Vin into a switching output power V2. The hybrid output stage 40 receives and combines the linear output power V1 and the switching output power V2 to generate the output power Vout. Furthermore, the hybrid output stage 40 provides a current isolation function to prevent the respective currents of the linear output power V1 and the switching output power V2 from interfering with each other. In other words, the current of the linear output power V1 does not flow into the current of the switching output power V2, and accordingly, the current of the switching output power V2 does not flow into the current of the linear output power V1.

Additionally, the first current sensing unit 21 and the second current sensing unit 31 respectively sense the linear output power V1 and the switching output power V2, more specifically the respective loading currents of the linear output power V1 and the switching output power V2. The first current sensing signal CS1 and the second current sensing signal CS2 are thus generated, representative of the loading state or the loading degree.

The microcontroller 10 receives the first current sensing signal CS1 and the second current sensing signal CS2 and determines the loading state is light or heavy so as to actuate (turn on) or cease (turn off) the operation of the linear regulator 20 and the switching regulator 30.

In an actual operation, the microcontroller 10 may first turn on the linear regulator 20 and turn off the switching regulator 30 when the input power Vin is supplied at the very beginning. This is because the loading current is initially zero and the loading state is considered to be light. Thus, the output power Vout of the hybrid output stage 40 contains only the linear output power V1 from the linear regulator 20. Subsequently, as the loading state gradually reaches a stable state, the first current sensing signal CS1 from the first current sensing unit 21 by sensing the linear output power V1 is received by the microcontroller 10 and used to determine whether the current loading state becomes heavy, like the first current sensing signal CS1 exceeding a preset threshold value. If the loading state is still light, the same as the original state at the beginning, the linear regulator 20 is kept turned on and the switching regulator 30 is turned off. IF the loading state changes from light to heavy, the switching regulator 30 is turned on and at the same time the linear regulator 20 is also turned on, and subsequently the linear regulator 20 is turned off only when the switched output power V2 of the switching regulator 30 is stable or steady. In other words, during the transient period when the loading state becomes heavy from light and the switched output power V2 is not stable, the linear regulator 20 and the switching regulator 30 concurrently operate to provide the linear output power V1 and the switched output power V2, respectively.

Accordingly, the microcontroller 10 may determine whether the loading state is kept heavy based on the second current sensing signal CS2 from the second current sensing unit 31. If the loading state is heavy, the switching regulator 30 is kept turned on and the linear regulator 20 is turned off. When the loading state changes from heavy to light, the microcontroller 10 first turns on the linear regulator 20 and the operation of the switching regulator 30 is still kept working. Only when the linear output power V1 becomes steady or stable, the switching regulator 30 is turned off. That is, during the transient period when the loading state changes from heavy to light and the linear output power V1 is not steady, the linear regulator 20 and the switching regulator 30 operate together.

Therefore, whether the loading state changes from light to heavy or from heavy to light, the respective normal regulations of the linear regulator 20 and the switching regulator 30 overlap during the transient period so as to fulfill the object of seamless switching, thereby greatly improving stability of the output power Vout.

More specifically, the microcontroller 10 performs a control operation consisting of specific steps, which will be described in detail as below. First, when the input power Vin begins to supply, the linear regulator 20 is turned on and the switching regulator 30 is turned off. Next, enter a sensing and determining step for receiving the first and second sensing signals CS1 and CS2 and further determining the loading states of the linear output power V1 and the switching output power V2 based on the first and second sensing signals CS1 and CS2. More specifically, if the loading state of the linear output power V1 is still light, the current situation is maintained, including the linear regulator 20 turned on and the switching regulator 30 turned off. If the loading state of the linear output power V1 changes from light to heavy, the switching regulator 30 is turned on, and subsequently only when the switching output power V2 of the switching regulator 30 becomes stable or steady, the linear regulator 20 is turned off. Then, if the loading state of the switching output power V2 is still heavy, the linear regulator 20 is kept turned off and the switching regulator 30 turned on. When the loading state of the switching output power V2 changes from heavy to light, the linear regulator 20 is immediately turned on with the switching regulator 30 still turned on. Next, the switching regulator 30 is turned off only when the linear output power V1 of the linear regulator 20 becomes stable or steady. Subsequently, return back to the sensing and determining step and repeat the operations as mentioned above.

Figure 2:
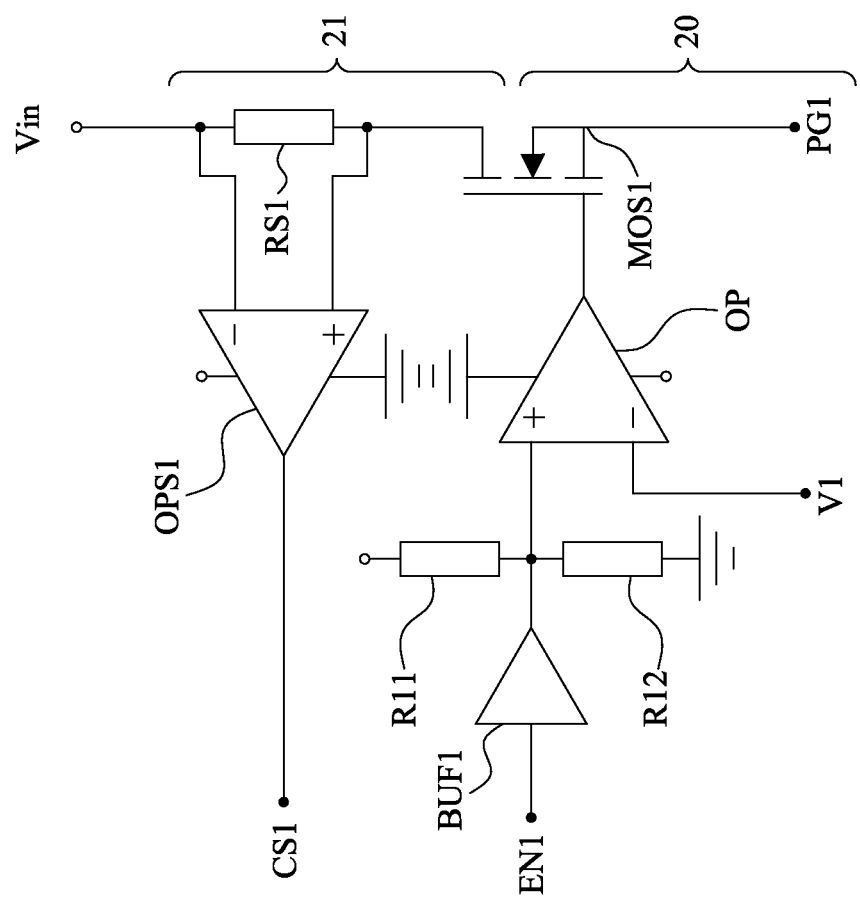
FIG. 2 is an illustrative circuit of the linear regulator of the hybrid power supply architecture according to the present invention.
Figure 3:
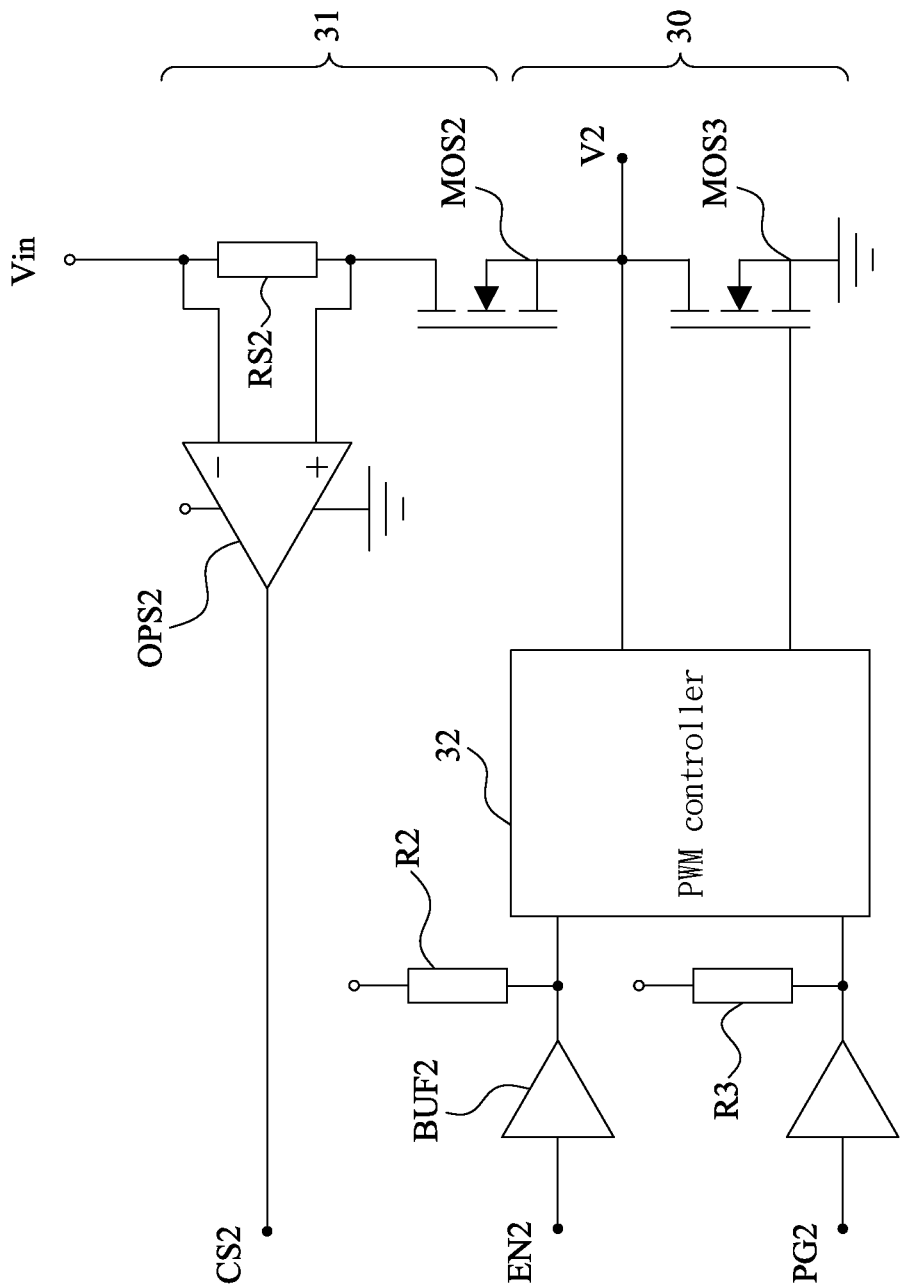
FIG. 3 is an illustrative circuit of the switching regulator of the hybrid power supply architecture according to the present invention.
Figure 4:
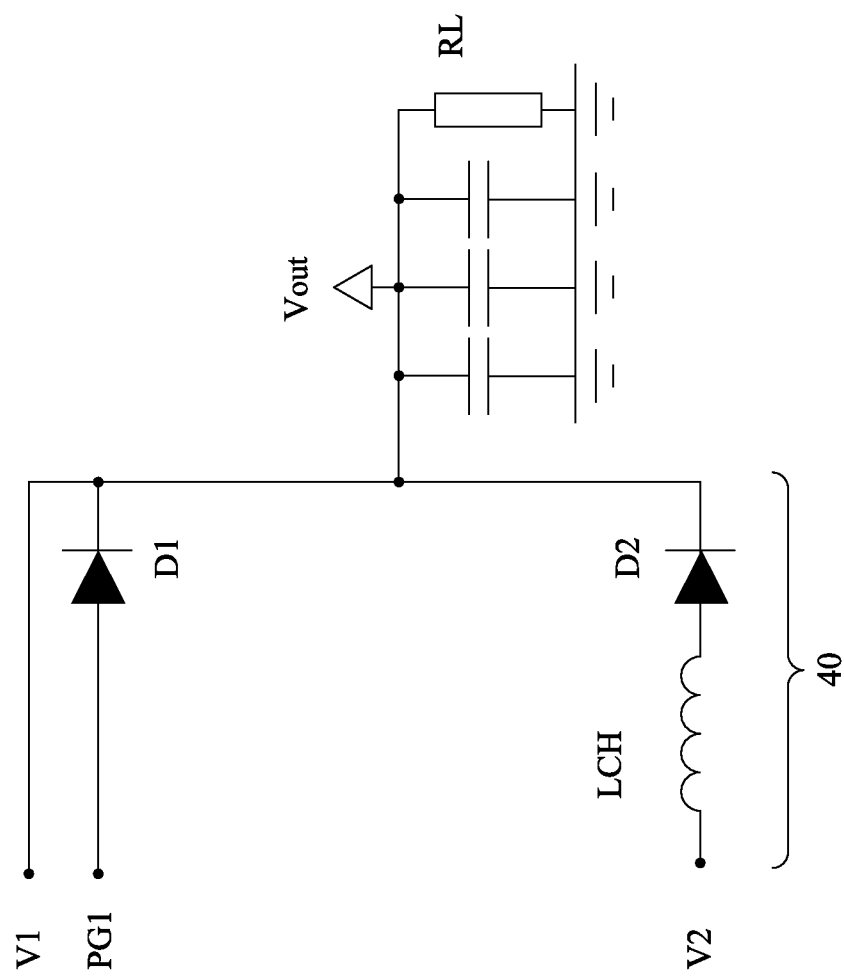
FIG. 4 is an illustrative circuit of the hybrid output stage of the hybrid power supply architecture according to the present invention.

Please further refer to FIGS. 2, 3 and 4. FIG. 2 shows an illustrative circuit of the linear regulator 20 and the first current sensing unit 21 of the present invention, FIG. 3 illustrates an exemplary circuit of the switching regulator 30 and the second current sensing unit 31 of the present invention, and FIG. 4 is an illustrative circuit of the hybrid output stage 40 of the present invention. It should be noted that the circuits shown in FIGS. 2, 3 and 4 are typical examples of the present invention and only intended to clearly and practically explain the features of the hybrid power supply architecture according to the present invention. That is, the scope of the present invention is not limited by the above illustrative examples, and the specific electronic components in FIGS. 2, 3 and 4 may substantially include other elements or devices having equivalent electrical functions.

As shown in FIG. 2, the linear regulator 20 comprises a first buffer BUF1, a pull-up resistor R11, a pull-down resistor R12, an operational amplifier OP and a first transistor MOS1, and the first current sensing unit 21 comprises a first operational amplifier OPS1 and a first sensing resistor RS1.

The first buffer BUF1 receives the first enable signal EN1 from the microcontroller 10, and generates and transmits a buffered output signal to a non-inverse input port of the operational amplifier OP so as to turn on the linear regulator 20 for linear regulation. The non-inverse input port is further connected to the pull-up resistor R11 and the pull-down resistor R12 to perform a clamping effect, thereby preventing the buffered output signal of the first buffer BUF1 from being too high or too low. As a result, the operational amplifier OP is well protected. Additionally, an inverse input port of the operational amplifier OP is connected to the linear output power V1 and generates a first control signal fed to a gate of the first transistor MOS1 for controlling the first transistor MOS1 to turn on or off. A source of the first transistor MOS1 generates a first notice signal PG1.

The first sensing resistor RS1 is connected between the input power Vin and a drain of the first transistor MOS1, and further connected to a non-inverse input port and an inverse input port of the first operational amplifier OPS1 such that the voltage of the first sensing resistor RS1 is amplified by the first operational amplifier OPS1 and the first current sensing signal CS1 is generated by an output port of the first operational amplifier OPS1.

As shown in FIG. 3, the switching regulator 30 generally comprises a second buffer BUF2, a pull-up resistor R2, a Pulse Width Modulation (PWM) controller 32, an another pull-up resistor R3, a second transistor MOS2 and a third transistor MOS3, and the second current sensing unit 31 comprises a second operational amplifier OPS2 and a second sensing resistor RS2.

The second buffer BUF2 of the switching regulator 30 is configured to receive the second enable signal EN2 from the microcontroller 10 and generates and transmits a buffered output signal corresponding to the second enable signal EN2 to the PWM controller 32 so as to turn on the PWM controller 32 for performing a switching regulation function. At the same time, the PWM controller 32 receives the switching output power V2 and generates a second notice signal PG2 indicating that the switching output power V2 is stable. The second notice signal is further transmitted to the microcontroller. Moreover, the PWM controller 32 generates two PWM signals according to the switching output power V2 for driving a gate of the second transistor MOS2 and a gate of the third transistor MOS3, respectively. A source of the second transistor MOS2 is connected to a drain of the third transistor MOS3, and a source of the third transistor MOS3 is grounded.

Specifically, the second sensing resistor RS2 of the second current sensing unit 31 is connected between the input power Vin and a drain of the second transistor MOS2 and further connected to a non-inverse input port and an inverse input port of the second operational amplifier POS2, and an output port of the second operational amplifier OPS2 generates the second current sensing signal, CS2.

As shown in FIG. 4, the hybrid output stage 40 comprises a first diode D1, a choke coil LCH and a second diode D2. A positive end of the first diode D1 is connected to the first notice signal PG1, a negative end of the first diode D1 is connected to the linear output power V1. One end of the choke coil LCH is connected to the switching output power V2, another end of the choke coil LCH is connected to a positive end of the second diode D2, and a negative end of the second diode D2 is connected to the linear output power V1. Therefore, the current of the linear output power V1 and the switching output power V2 are electrically isolated with by the second diode D2 with rectification, thereby achieving the object of preventing the respective currents from interfering with other.

From the above mentioned, one aspect of the present invention is that the microcontroller dynamically turns on/off the linear regulator and/or the switching regulator to actuate/cease regulation based on the loading state. In particular, the linear regulator and the switching regulator can perform linear regulation and switching regulation for light and heavy loading, respectively, thereby greatly increasing the overall efficiency of power conversion.

Another aspect of the present invention is that the linear regulator and the switching regulator operate together during the transient period when the loading state changes from light to heavy or from heavy to light. The linear regulator is turned off only when the loading state is heavy and the switching output power becomes stable or steady. Similarly, the switching regulator is turned off only when the loading state is light and the linear output power is stable or steady. Therefore, the output power is firmly stabilized so as to fulfill the purpose of power supply with seamless switching.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A hybrid power supply architecture for converting an input power into an output power supplied to an external load, comprising:
   a microcontroller;
   a linear regulator for receiving the input power and performing linear regulation under control of the microcontroller to convert the input power into a linear output power;
   a first current sensing unit for sensing a loading current related to the linear output power so as to generate a first sensing signal representative of a loading state corresponding to the linear output power;
   a switching regulator for receiving the input power and performing switching regulation under control of the microcontroller to convert the input power into a switching output power;
   a second current sensing unit for sensing a loading current related to the switching output power so as to generate a second sensing signal representative of a loading state corresponding to the switching output power; and
   a hybrid output stage for receiving and combining the linear output power and the switching output power into the output power and providing a current isolation effect to prevent respective currents of the linear output power and the switching output power from interfering with each other,
   wherein the microcontroller receives the first and second sensing signals so as to determine the loading state of the linear output power is light or heavy, and the loading state of the switching output power is light or heavy such that the linear regulator and/or the switching regulator is turned on or turned off.

2. The hybrid power supply architecture as claimed in claim 1, wherein the microcontroller performs a control operation comprising steps of:
  generating a first enable signal to turn on the linear regulator and turning off the switching regulator when the input power begins to supply;
  entering a sensing and determining step for receiving the first and second sensing signals and determining the loading state of the linear output power and the loading state of the switching output power based on the first and second sensing signals, respectively;
  keeping the linear regulator turned on and the switching regulator turned off if the loading state of the linear output power is still light;
  keeping the linear regulator turned on and generating a second enable signal to turn on the switching regulator if the loading state of the linear output power changes from light to heavy;
  ceasing the first enable signal to turn off the linear regulator if the switching output power of the switching regulator becomes steady;
  keeping the linear regulator turned off and the switching regulator turned on if the loading state of the switching output power is heavy;
  keeping the switching regulator turned on and generating the first enable signal to turn on the linear regulator if the loading state of the switching output power changes from heavy to light; and
  ceasing the second enable signal to turn off the switching regulator if the linear output power of the linear regulator becomes steady, and returning back to the sensing and determining step for performing subsequent operations.

3. The hybrid power supply architecture as claimed in claim 2, wherein the linear regulator comprises a first buffer, a pull-up resistor, a pull-down resistor, an operational amplifier and a first transistor, the first buffer receives the first enable signal from the microcontroller and generates and transmits a buffered output signal to a non-inverse input port of the operational amplifier so as to turn on the linear regulator, the non-inverse input port is further connected to the pull-up resistor and the pull-down resistor to perform a clamping effect, an inverse input port of the operational amplifier is connected to the linear output power and generates a first control signal fed to a gate of the first transistor, and a source of the first transistor generates a first notice signal.

4. The hybrid power supply architecture as claimed in claim 3, wherein the first current sensing unit comprises a first operational amplifier and a first sensing resistor, the first sensing resistor is connected between the input power and a drain of the first transistor, and further connected to a non-inverse input port and an inverse input port of the first operational amplifier, and an output port of the first operational amplifier generates the first current sensing signal.

5. The hybrid power supply architecture as claimed in claim 4, wherein the switching regulator comprises a second buffer, a pull-up resistor, a Pulse Width Modulation (PWM) controller, an another pull-up resistor, a second transistor and a third transistor, the second buffer receives the second enable signal from the microcontroller and generates and transmits a buffered output signal to the PWM controller so as to turn on the PWM controller for performing a switching regulation function, the PWM controller receives the switching output power and generates a second notice signal based on the switching output power, the second notice signal indicating that the switching out power is stable is transmitted to the microcontroller, the PWM controller generates two PWM signals according to the switching output power for driving a gate of the second transistor and a gate of the third transistor, respectively, a source of the second transistor is connected to a drain of the third transistor, and a source of the third transistor is grounded.

6. The hybrid power supply architecture as claimed in claim 5, wherein the second current sensing unit comprises a second operational amplifier and a second sensing resistor, the second sensing resistor is connected between the input power and a drain of the second transistor and further connected to a non-inverse input port and an inverse input port of the second operational amplifier, and an output port of the second operational amplifier generates the second current sensing signal.

7. The hybrid power supply architecture as claimed in claim 6, wherein the hybrid output stage comprises a first diode, a choke coil and a second diode, a positive end of the first diode is connected to the first notice signal, a negative end of the first diode is connected to the linear output power, one end of the choke coil is connected to the switching output power, another end of the choke coil is connected to a positive end of the second diode, and a negative end of the second diode is connected to the linear output power.

* * * * *